(12) United States Patent
Whiteley

(10) Patent No.: US 8,398,756 B2
(45) Date of Patent: Mar. 19, 2013

(54) SEPARATOR WITH LIQUID CARRY-OVER REDUCTION ASSEMBLY

(75) Inventor: James D. Whiteley, Grand Junction, CO (US)

(73) Assignee: Cimarron Energy, Inc., Oklahoma, OK (US)

( * ) Notice: Subject to any disclaimer, the term of this patent is extended or adjusted under 35 U.S.C. 154(b) by 581 days.

(21) Appl. No.: 12/465,161

(22) Filed: May 13, 2009

(65) Prior Publication Data

US 2009/0282985 A1 Nov. 19, 2009

Related U.S. Application Data

(60) Provisional application No. 61/052,818, filed on May 13, 2008.

(51) Int. Cl.
*B01D 19/00* (2006.01)
(52) U.S. Cl. .................. 96/184; 96/189; 96/206; 96/220
(58) Field of Classification Search .................. 96/182, 96/184, 186, 188, 189, 204, 206, 220
See application file for complete search history.

(56) References Cited

U.S. PATENT DOCUMENTS

| | | | |
|---|---|---|---|
| 1,775,362 A | 9/1930 | Demarcus | |
| 4,583,998 A * | 4/1986 | Reid et al. | 95/253 |
| 4,614,527 A | 9/1986 | Reimann | |
| 5,232,475 A | 8/1993 | Jepson | |
| 5,288,312 A | 2/1994 | Payne et al. | |
| 6,413,299 B1 | 7/2002 | Haukeness | |
| 7,014,757 B2 | 3/2006 | Rhodes | |

* cited by examiner

*Primary Examiner* — Robert A Hopkins
(74) *Attorney, Agent, or Firm* — Dunlap Codding, P.C.

(57) ABSTRACT

A separator which includes a vessel with a horizontal section defining a horizontal chamber and a vertical section defining a vertical chamber. The vertical section extends upwardly from the horizontal section. A tubular member is positioned in the vertical section in such a way that the tubular member provides a fluid passage between the horizontal chamber and the vertical chamber and cooperates with the vertical section and the horizontal section to define a liquid receiving space. A deflector plate is spaced from the upper end of the tubular member in such a way that fluid passing up through the tubular member is deflected into the liquid receiving space and returned to the horizontal chamber.

15 Claims, 2 Drawing Sheets

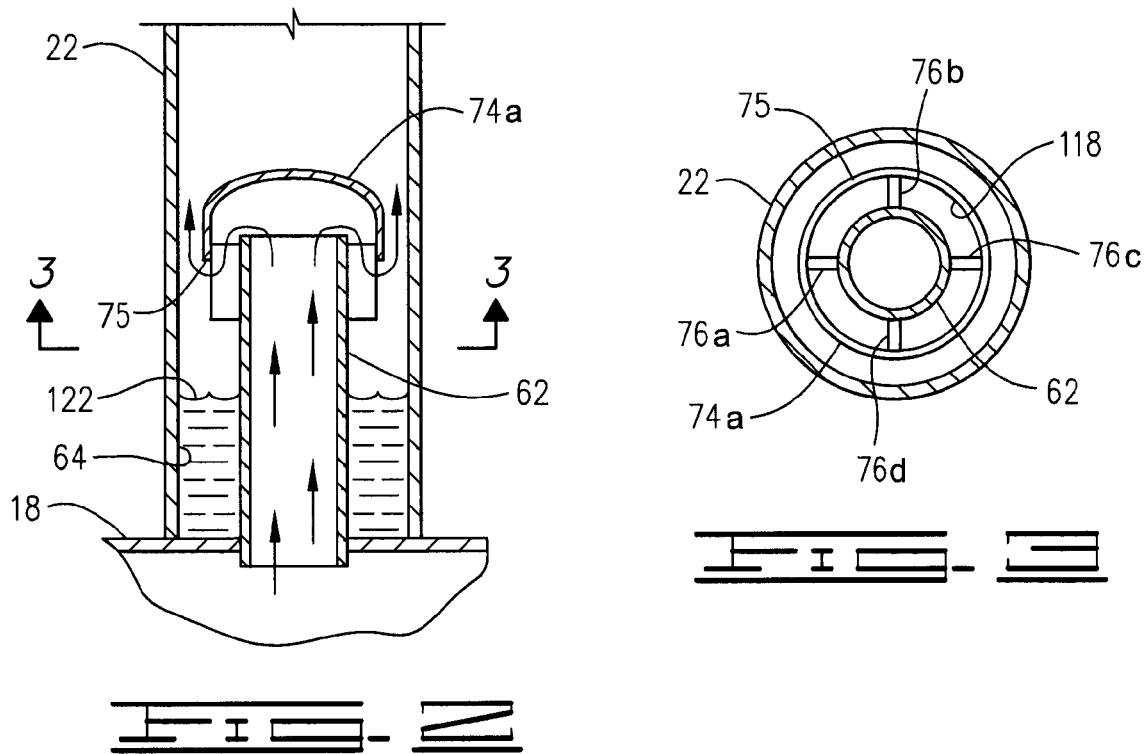
FIG-2
FIG-3
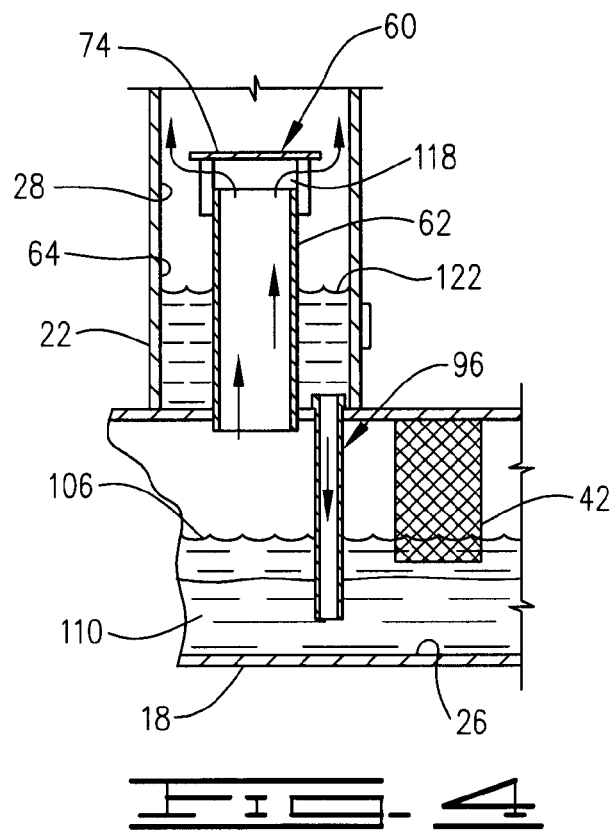
FIG-4

SEPARATOR WITH LIQUID CARRY-OVER REDUCTION ASSEMBLY

CROSS REFERENCE TO RELATED APPLICATIONS

This application claims benefit of provisional application U.S. Ser. No. 61/052,818, filed May 13, 2008, which is hereby expressly incorporated herein by reference in its entirety.

BACKGROUND OF THE INVENTION

1. Field of the Invention

The present invention relates generally to separators for separating liquids and gases and/or liquids and liquids. More particularly, but not by way of limitation, the present invention relates to high-volume separators for removing liquids such as oil and water from natural gas.

2. Brief Description of Related Art

Separators are often used to separate liquids from gases, as well as liquids from other liquids. Some separators separate oil and gas, or water and gas. Other separators separate oil, water and gas. When gas is separated, it generally migrates to the top of the separator vessel due to its relatively lower density. However, in separators processing high volumes of liquid, and during surges in separators, liquid may not be sufficiently removed from the gas, and may pass through the separator to the gas outlet. One solution to this problem is to use a bigger vessel. However, this can be expensive.

As such, there is a perpetual need for more-efficient, more-effective, and/or less-expensive separators such as, for example, separators for removing oil and water from gas.

BRIEF DESCRIPTION OF THE DRAWINGS

FIG. 2 is a sectional view of another embodiment of a liquid carryover reduction assembly.

FIG. 3 is a sectional view taken along line 3-3 of FIG. 2.

FIG. 4 is a sectional view of another embodiment of a liquid return line.

DETAILED DESCRIPTION OF EXEMPLARY EMBODIMENTS

Figure 1:
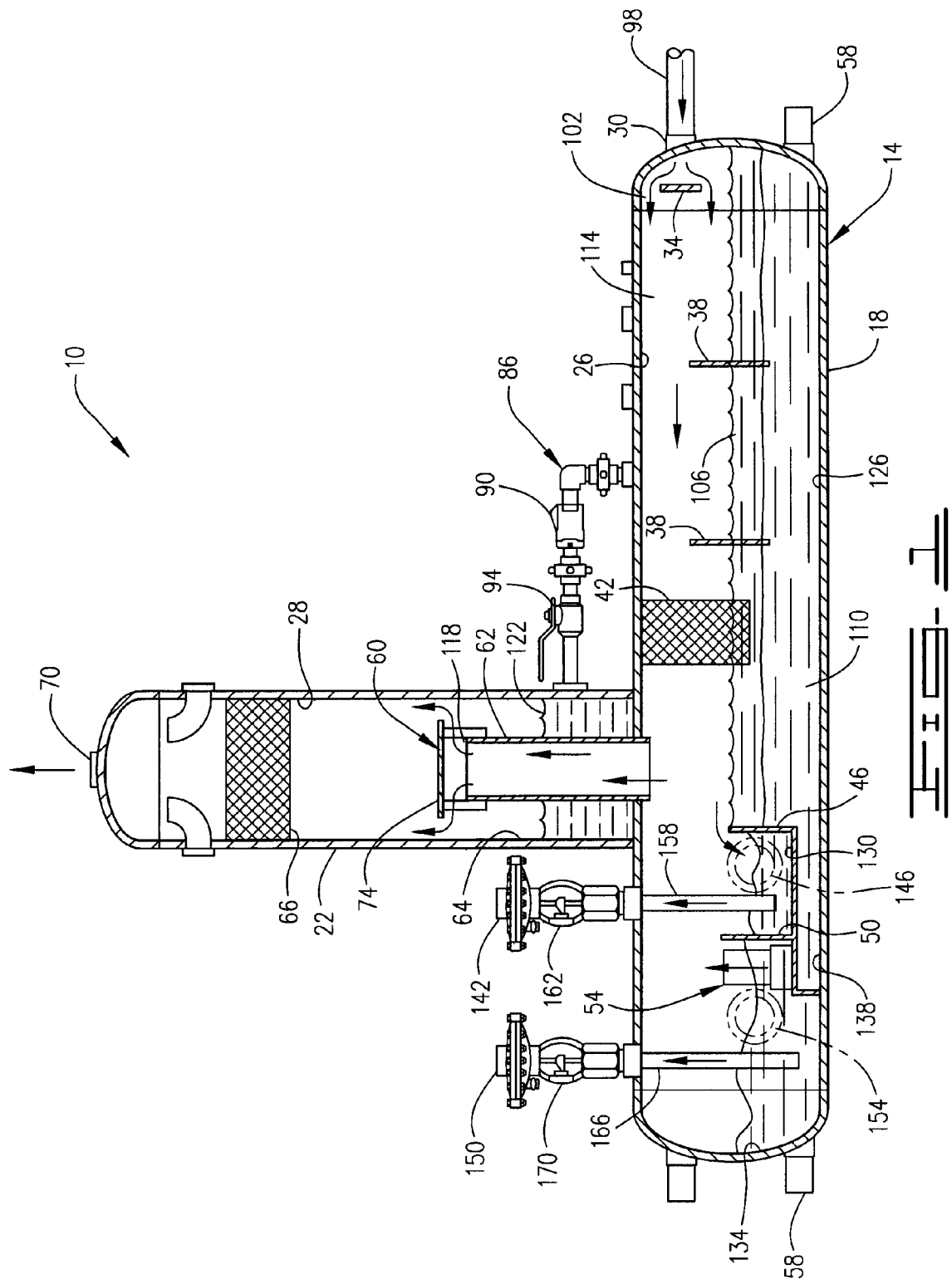
FIG. 1 is a sectional view of a separator constructed in accordance with the present invention.

Referring now to the drawings, and more particularly to FIG. 1, shown therein and designated by the reference numeral 10 is a separator constructed in accordance with the present invention. The exemplary embodiment of the separator 10 shown is for high-volume separation of oil and water from gas in such a way that the oil and water are also separated from one another. Other embodiments may only separate one liquid from a gas, or may separate multiple liquids from a gas without separating the multiple liquids.

The separator 10 includes a vessel 14 having a horizontal section 18 and a vertical section 22. The horizontal section 18 of the vessel 14 is preferably formed with an elongated, cylindrical shape, as shown, that defines a horizontal chamber 26. For example, the horizontal section 18 of the vessel 14 may be a substantially-circular cylinder having a diameter of about 20 inches and a length of about 90 inches. Other embodiments of the horizontal section 18 may be formed with any suitable shape such as, for example, rectangular, square, triangular, or the like, and may be formed with any suitable dimensions. The horizontal section 18 of the vessel 14 preferably includes an inlet 30, an inlet baffle 34, quieting baffles 38, a mist pad 42, a spillway wall 46, a wall 50, a liquid-liquid weir 54, and one or more cleanouts 58. It will be appreciated, however, that the horizontal section 18 may include a variety of components which cooperate with one another to cause liquid and gas to separate from each other. The description of the construction and operation of the horizontal section 28 contained herein is intended to provide an example of one arrangement of a horizontal section suitable for separating liquids from gases, and is not intended to be limiting. It should be understood that a number of variations to the components and the configuration of those components described herein can be made without changing the scope of the invention set forth herein.

The vertical section 22 of the vessel 14 is preferably formed with an elongated, cylindrical shape, as shown, that defines a vertical chamber 28. For example, the vertical section 22 of the vessel 14 may be a substantially-circular cylinder having a diameter of about 16 inches and a length of about 48 inches. Other embodiments of the vertical section 22 may be formed with any suitable shape such as, for example, rectangular, square, triangular, or the like, and may be formed with any suitable dimensions. The vertical section 22 is preferably substantially perpendicular to the horizontal section 18, but may be angularly disposed from the horizontal section 18 in any suitable configuration. The vertical section 22 of the vessel 14 preferably includes a liquid carryover reduction assembly 60, a mist pad 66, and a gas outlet 70.

The inlet 30 is preferably connected to a supply pipe 98 that delivers an unseparated mixture such as, for example, gas, oil, and water (that may be steam) from a well head (not shown) or the like. In the preferred embodiment, the vessel 14 is preferably constructed such that the vessel 14 is capable of operating at high separation rates and high internal pressures. For example, in one embodiment, the separator 10 functions at an operating pressure between about 150 psig and about 250 psig, more preferably between about 175 psig and about 225 psig, and most preferably about 200 psig. In one embodiment, the separator 10 is also preferably capable of processing a mixture of gas, oil, and water at a rate of about 4 Million Standard Cubic Feet per Day (MMSCFD) of Gas and a combined liquid capacity of about 800 barrels per day (bbl/d) with a retention time of about three minutes.

The operation of the separator 10 will be described herein as separating an exemplary mixture of gas, oil, and water, in which the preferred gaseous portion is the gas and the preferred liquid portions are the oil and water. However, as will be appreciated by those skilled in the art, the separator 10 may be used to separate various mixtures having any number of components. As the mixture enters the separator 10 through the inlet 30, the mixture hits the inlet baffle 34. The mixture preferably enters the separator 10 at a relatively high velocity and/or pressure such that when the mixture impacts the inlet baffle 34, it is forced to flow around the inlet baffle 34, as indicated by the arrows 102. As will be appreciated by those skilled in the art, the gas portion of the mixture has less resistance to changes in direction and will primarily flow around the inlet baffle 34. In contrast, the liquid portion(s) of the mixture, and even the vaporized liquid portions of the mixture, have a higher mass and resulting higher resistance to changes in direction, such that at least a portion of the water and oil in the initial mixture will impact the inlet baffle 34 and will be carried downward by gravity into the bottom of the horizontal section 18 of the vessel 14, as indicated by the layers of oil 106 and water 110. Generally, not all of the liquid components of the mixture are removed by the inlet baffle 34, however, and as the mixture flows past the inlet baffle 34, the mixture is preferably separated into a primarily-liquid mixture, e.g., oil 106 and water 110, and a primarily-gaseous mixture, e.g., gas 114.

At least the primarily-gaseous mixture next flows through the quieting baffles 38. The quieting baffles 38 are preferably constructed to encourage laminar flow of the mixture such that the flow characteristics of the mixture preferably become smoother and more uniform and permit gravity to carry the relatively heavier components, e.g., oil and water, downward and out of the gas, as well as to permit the relatively heavier liquid, e.g., water, downward and out of the oil, as indicated by the layers of oil 106 and water 110 shown. Various suitable configurations for the quieting baffles 38 are known in the art, and any functional variety may be used.

After passing through the quieting baffles 38, at least the primarily-gaseous mixture flows through the mist pad 42. The mist pad 42 preferably extends from the top of the horizontal chamber 26 down into the primarily-liquid mixture such that all of the primarily-liquid mixture passes through the mist pad 42. The mist pad 42 is preferably constructed of a porous material such as, for example, a wire mesh, screen, sponge, or the like. The mist pad 42 operates in similar fashion to the inlet baffle 34 in that the pores of the mist pad 42 provide a nonlinear path for the gas of the mixture to flow through, while the intermediate solid portions interrupt the flow of heavier portions, e.g., oil and water, of the mixture to separate these heavier portions from the mixture. In one embodiment, the mist pad 42 is constructed of a wire mesh material having a thickness of about six inches. In other embodiments, the mist pad 42 may be formed of any suitable material in any suitable shape. In yet further embodiments, the mist pad 42 may include any suitable number of mist pads 42, may be substituted with similar structures, or may be omitted entirely.

After passing through the mist pad 42, the primarily-gaseous mixture flows from the horizontal chamber 26 into the vertical chamber 28 via the liquid carryover reduction assembly 60. The liquid carryover reduction assembly 60 functions to deflect liquids that may enter the vertical chamber 28 away from the gas outlet 70 and back to the horizontal chamber 26. The liquid carryover reduction assembly 60 includes a tubular member 62 and a deflector plate 74.

The tubular member 62 of the liquid carryover reduction assembly 60 is positioned in the vertical section 22 and is connected to and extends upwardly from the horizontal section 18 toward the upper end of the vertical section 22 in such a way that the tubular member 62 provides a fluid passage between the horizontal chamber 26 and the vertical chamber 28. The tubular member 62 further cooperates with the vertical section 22 and the horizontal section 18 to define a liquid receiving space 64. In the present embodiment, tubular member 62 is concentrically positioned relative to the vertical section 22 so that the liquid receiving space 64 is substantially annular; however, it should be understood that the liquid receiving space 64 could take a variety of forms. For example, the liquid receiving space 64 may extend only partially about the tubular member 62. Also, it is contemplated that the fluid passage defined by the tubular member 62 and the liquid receiving space 64 may be reversed such that the area between the tubular member 62 and the vertical section 22 functions as the fluid passage and the interior of the tubular member 62 functions as the liquid receiving space 74.

A deflector plate 74 is connected to an upper end of the tubular member 62 in such a way that a significant portion of the liquid carried up through the tubular member 62 will contact the underside of the deflector plate 74 and will be deflected or redirected in an outward and downward direction and will pass into the liquid receiving space 64. The liquid will also contact the deflector plate 74 so that a portion of the liquid may be deflected back down the tubular member 62 and into the horizontal chamber 26.

The deflector plate 74 is connected to the tubular member 62 with a plurality of connector members 76*a*, 76*b*, 76*c*, and 76*d* (best shown in FIG. 3) extending between the tubular member 62 and the deflector plate 74 in a spaced apart relationship to one another so as to define at least one opening 118 between the tubular member 62 and the deflector plate 74.

The deflector plate 74 is shown in FIG. 1 as a flat circular plate having a diameter greater than the diameter of the tubular member 62. FIGS. 2 and 3 illustrate another embodiment of a deflector plate 74*a*. The deflector plate 74*a* is a hollow dome-shaped member having a lower annular edge 75 and a diameter greater than the diameter of the tubular member 62. The deflector plate 74*a* is preferably connected to the tubular member 62 so that the lower edge 75 of the deflector plate 74*a* is positioned below the upper end of the tubular member 62. As the primarily-gaseous mixture passes up through the tubular member 62, the deflector plate 74*a* will cause the travel path of the primarily-gaseous mixture to be redirected in an outward and downward direction. Upon the primarily-gaseous mixture passing beyond the lower edge 75 of the deflector plate 74*b*, the gas will migrate toward the gas outlet 70 causing the gas to reverse its direction in such a way that the liquid, which is heavier than the gas, to continue traveling in a downward direction and into the liquid receiving space 64.

While two embodiments of the deflector plate 74 and 74*a* have been depicted, it should be appreciated that the deflector plate may be formed to have a variety of shapes and configurations which function to produce the desired result of the liquid being returned to the horizontal chamber 26. It should be understood that the spacing and dimensions of the various components of the liquid carry-over reduction assembly 60 will vary as a function of variables such as gas composition, temperature, pressure, gas flow rate, and anticipated liquid carry-over volume.

The gas traveling towards the gas outlet 70 preferably continues to flow upwards and subsequently passes through the mist pad 66. The mist pad 66 is preferably similar in form and function to the mist pad 42, described above. However, the mist pad 66 preferably spans the full width of the vertical chamber 28 such that substantially all of the gas exiting the openings 118 of the liquid carryover reduction assembly 60 flows through the mist pad 66. As described above with reference to the mist pad 42, the mist pad 66 preferably removes at least a portion of any remaining liquid portions, e.g., oil and water, from the gas. The liquid portions, e.g., oil and water, collected by the mist pad 66 preferably condense and fall downward into the liquid receiving space 64. It will be appreciated that the deflector space 74 further functions to deflect liquid falling from the mist pad 66 into the liquid receiving space 64.

A liquid return line 86 extends between the liquid receiving space 64 and the horizontal chamber 26 in such a way that liquid that passes into the liquid receiving space 64 is able to flow from the liquid receiving space 64 to the horizontal chamber 26. Thus, as the level of liquid 122 in the liquid receiving space 64 reaches the level of the liquid return line 86, the liquid 122 preferably passes through the liquid return line 86 and back into the horizontal chamber 26.

In one embodiment, a portion of the liquid return line 86 (FIG. 1) is positioned externally relative to the vessel 14. The liquid return line 86 extends from the vertical chamber 28 to the horizontal chamber 26 between the fluid inlet 30 of the horizontal section 18 and the vertical intersection of the horizontal section 18 and the vertical section 22, so as to enable fluid communication between the liquid receiving space 64 and the horizontal chamber 26. The liquid return line 86 preferably includes a check valve 90 and a shutoff valve 94. In other embodiments, either or both of the check valve 90 and the shutoff valve 94 may be substituted, combined, omitted, or the like.

The liquid return line 86 is aligned with the quieting baffles 38 such that the liquid 122 from the liquid return line 86a will preferably fall into a relatively calm flow area and be permitted to settle into its component parts within the horizontal chamber 26. In other embodiments, the liquid return line 86 may be disposed in any suitable location, but is preferably adjacent to or downstream of the quieting baffles 38 so as to minimize the amount of liquid returned to the primarily-gaseous mixture.

FIG. 4 illustrates another embodiment of a liquid return line 86a in the form of a tubular downcomer 96. The tubular downcomer 96 provides a pathway for the liquid to travel from the liquid receiving space 64 to the horizontal chamber 26. The tubular downcomer 96 extends from the liquid receiving space 64 into the horizontal chamber 26 such that the lower end of the tubular downcomer 96 is positioned below the surface of the liquid passing through the horizontal chamber 26. As shown, the upper end of the tubular downcomer 96 is preferably located a relatively small distance above the bottom of the liquid receiving space 64 such that at least some portion of any solid contaminants are trapped in the bottom of the liquid receiving space 64 rather than returned with the liquid 122. As such, the vertical section 22 may be provided with a drain (not shown) to allow periodic cleaning of the liquid receiving space 64. The position of the lower end of the tubular downcomer 96 below the surface of the liquid in the horizontal chamber 26 is desirable because it forms a liquid seal which prevents the migration of gas up through the tubular downcomer 96.

As the liquid 122 from the liquid return line 86 returns to the horizontal chamber 26, the liquid falls through the gas 114 and separates into its component parts, e.g., oil and water. These component parts then join the liquid 106 and 100 already in the horizontal section 18. As shown, the density differential between the oil and water preferably causes the oil to migrate upward to an oil layer 106, and preferably causes the water to migrate downward to a water layer 110 below the oil layer 106. The liquid layers, e.g., 106 and 110, preferably flow toward the spillway wall 46.

The spillway wall 46 and the divider wall 50 cooperate to divide a lower part of the horizontal section 18 into a primary basin 126, an oil basin 130, and a water basin 134. As shown, the divider wall 50 preferably extends above the spillway wall 46 such that the top of the water basin 134 extends above the top of the oil basin 130. Because the top of the primary basin 126 and the top of the oil basin 130 are both limited by the spillway wall 46, the tops of the primary basin 126 and oil basin 130 are preferably at the same height. Additionally, the spillway wall 46 is shaped to define a passageway 138 passing under the oil basin 130 and under a portion of the water basin 134 as well. The liquid-liquid weir 54 is preferably cooperatively associated with the spillway wall 46 to enable fluid communication between the water basin 134 and the passageway 138. The liquid-liquid weir 54 is also preferably adjustable in functional height, or the distance the liquid-liquid weir 54 extends above the spillway wall 46, such that the flow therethrough may be adjusted as necessary to achieve desirable functional characteristics.

As oil flows over the spillway wall 46 into the oil basin 130, water will flow under the spillway wall 46 and through the passageway 138. When the uppermost level of oil is above the top of the liquid-liquid weir 54, water is forced through the liquid-liquid weir 54 and into the water basin 134. Depending on a number of factors, such as for example, the relative amounts of oil and water, the flowrate of the mixture into the separator 10, and the like, the height of the liquid-liquid weir 54 may be, and preferably is, selectively adjusted to ensure that the oil and water are effectively separated as described. For example, the height of the liquid-liquid weir 54 is preferably such that the level of water layer 110 is substantially maintained above the passageway 138 so that oil is prevented from passing into the passageway 138 or through the liquid-liquid weir 54. Similarly, the level of the water layer 110 is preferably maintained below the top of the spillway wall 46 such that water is substantially prevented from flowing into the oil basin 130.

The horizontal section 18 preferably further includes an oil outlet 142, an oil sensor 146, a water outlet 150, and a water sensor 154. The oil outlet 142 preferably includes an uptake pipe 158 and a valve 162. As shown, the uptake pipe 158 of the oil outlet 142 preferably extends into the oil basin 130 such that the oil in the oil basin 130 will cover a lower part of the uptake pipe 158. The oil sensor 146 is preferably in communication with the valve 162 and disposed at least partially within or adjacent to the oil basin 130 such that as the oil basin 130 fills, the oil sensor 146 will sense the rising level of oil, or will sense when the oil reaches a threshold level, and will signal or otherwise cause the valve 162 to open and permit oil to flow out of the oil basin 130 and out of the separator 10. For example, in one embodiment, the oil sensor 146, or a portion thereof, is disposed within or through the side of the horizontal section 18, such that a portion of the oil sensor 146 extends into the oil basin 130. In other embodiments, the oil sensor 146 may be an optical, thermal, infrared, magnetic, or other sensor than is capable of registering the level of oil in the oil basin, or is capable of registering a change in the level of oil in the oil basin 130, with or without any portion of the oil sensor 146 being disposed within the oil basin 130. Conversely, when oil in the oil basin 130 falls below the threshold level or falls faster than the threshold rate, the oil sensor 146 preferably signals or otherwise causes the valve 162 to close. In other embodiments, it is desirable for the oil sensor 146 to sense more than just the level of oil within the oil basin 130. For example, the oil sensor 146 may sense the undesirable presence of water within the oil reservoir 130, may sense the buildup of solid contaminants, or the like, and may alert an operator of such negative characteristics, for example, so the separator 10 may be shut down, cleaned, adjusted, or repaired.

Similarly, the water outlet 150 preferably includes an uptake pipe 166 and a valve 170, with the uptake pipe 166 preferably extending into the water basin 134 such that the water in the water basin 134 will cover a lower part of the uptake pipe 166. The water sensor 154 is preferably similar in construction, function, disposition, and mounting to the oil sensor 146, provided, however, that the water sensor is positioned to measure or register the level of water in the water basin 134, such that when the water in the water basin 134 reaches a threshold level or rises at a threshold rate, the valve 170 of the water outlet 150 opens and permits water to flow out of the water basin 134 and out of the separator 10. As described above for the oil outlet 142, when the water level in the water basin 134 falls below the threshold level or falls faster than the threshold rate, the water sensor 154 preferably signals or otherwise causes the valve 170 to close. As will be appreciated by those of ordinary skill in the art, the oil and water exiting the oil and water outlets 142 and 150, respectively, is preferably transferred by pipe, conduit, or the like into tanks or pipelines for storage, transportation, or use.

While various embodiments of the present invention are described herein, changes may be made in the embodiments of the invention described herein, or in the parts or the elements of the embodiments described herein, or in the steps or sequence of steps of the methods described herein, without departing from the spirit and/or the scope of the invention.

What is claimed is:

1. A separator, comprising:
   a vessel including a horizontal section defining a horizontal chamber and a vertical section defining a vertical chamber, the vertical section extending upwardly from the horizontal section, the horizontal section having a fluid inlet for receiving a fluid including gas and at least one liquid, and at least one liquid outlet for discharging liquid that separates from the gas in the horizontal chamber, the vertical chamber having a gas outlet at an upper end thereof for discharging gas that separates from the liquid;
   a tubular member positioned in the vertical section in such a way that the tubular member provides a fluid passage between the horizontal chamber and the vertical chamber, the tubular member cooperating with the vertical section and the horizontal section to define a liquid receiving space;
   a deflector plate spaced from the upper end of the tubular member in such a way that liquid passing up through the tubular member is deflected into the liquid receiving space while gas is allowed to pass to the gas outlet; and
   a liquid return line extending between the liquid receiving space and the horizontal chamber in such a way that liquid that passes into the liquid receiving space is able to flow from the liquid receiving space to the horizontal chamber, at least a portion of the return line positioned externally relative to the vessel.

2. The separator of claim 1, wherein the tubular member is positioned concentrically in relation to the vertical section.

3. The separator of claim 2, wherein the liquid receiving space is annular.

4. The separator of claim 1, wherein the deflector plate is substantially flat and has a diameter greater than the diameter of the tubular member.

5. The separator of claim 1, wherein the deflector plate is dome-shaped and has a diameter greater than the diameter of the tubular member.

6. The separator of claim 5, wherein the deflector plate has a lower edge positioned below the upper end of the tubular member.

7. The separator of claim 1, wherein the liquid return line intersects the horizontal section between the fluid inlet of the horizontal section and the vertical section.

8. The separator of claim 7, further comprising a mist eliminator positioned downstream of the intersection of the liquid return line and the horizontal section and upstream of the vertical chamber.

9. The separator of claim 1, further comprising a mist pad positioned between the deflector plate and the gas outlet.

10. A separator, comprising:
    a vessel including a horizontal section defining a horizontal chamber and a vertical section defining a vertical chamber, the vertical section extending upwardly from the horizontal section, the horizontal section having a fluid inlet for receiving a fluid including gas and at least one liquid, and at least one liquid outlet for discharging liquid that separates from the gas in the horizontal chamber, the vertical chamber having a gas outlet at an upper end thereof for discharging gas that separates from the liquid;
    a tubular member positioned in the vertical section in such a way that the tubular member provides a fluid passage between the horizontal chamber and the vertical chamber, the tubular member cooperating with the vertical section and the horizontal section to define a liquid receiving space;
    a deflector plate spaced from the upper end of the tubular member in such a way that liquid passing up through the tubular member is deflected into the liquid receiving space while gas is allowed to pass to the gas outlet;
    a liquid return line extending between the liquid receiving space and the horizontal chamber in such a way that liquid that passes into the liquid receiving space is able to flow from the liquid receiving space to the horizontal chamber, at least a portion of the return line positioned externally relative to the vessel; and
    wherein the liquid return line extends vertically from the liquid receiving space into the horizontal chamber such that a lower end of the liquid return line is positioned below the surface of the liquid passing through the horizontal chamber.

11. A separator, comprising:
    a horizontal section defining a horizontal chamber, the horizontal section having a fluid inlet for receiving a fluid including gas and at least one liquid and the horizontal section having at least one liquid outlet for discharging liquid that separates from the gas in the horizontal chamber;
    a vertical section extending upwardly from the horizontal section and having a gas outlet, the vertical section having a fluid passage between the horizontal chamber and the vertical chamber and a liquid receiving space;
    a deflector plate positioned in the vertical chamber such that liquid passing from the horizontal chamber to the vertical chamber is deflected away from the gas outlet and into the liquid receiving space while gas is allowed to pass to the gas outlet; and
    a liquid return line extending between the liquid receiving space and the horizontal chamber in such a way that liquid that passes into the liquid receiving space is able to flow from the liquid receiving space to the horizontal chamber, at least a portion of the return line positioned externally relative to the horizontal section and the vertical section.

12. The separator of claim 11, wherein the liquid return line intersects the horizontal section between the fluid inlet of the horizontal section and the vertical section.

13. The separator of claim 12, further comprising a mist eliminator positioned downstream of the intersection of the liquid return line and the horizontal section and upstream of the vertical chamber.

14. The separator of claim 11, further comprising a mist pad positioned between the deflector space and the gas outlet.

15. A separator, comprising:
    a horizontal section defining a horizontal chamber, the horizontal section having a fluid inlet for receiving a fluid including gas and at least one liquid and the horizontal section having at least one liquid outlet for discharging liquid that separates from the gas in the horizontal chamber;
    a vertical section extending upwardly from the horizontal section and having a gas outlet, the vertical section having a fluid passage between the horizontal chamber and the vertical chamber and a liquid receiving space;

a deflector plate positioned in the vertical chamber such that liquid passing from the horizontal chamber to the vertical chamber is deflected away from the gas outlet and into the liquid receiving space while gas is allowed to pass to the gas outlet;

a liquid return line extending between the liquid receiving space and the horizontal chamber in such a way that liquid that passes into the liquid receiving space is able to flow from the liquid receiving space to the horizontal chamber, at least a portion of the return line positioned externally relative to the horizontal section and the vertical section; and wherein the liquid return line extends vertically from the liquid receiving space into the horizontal chamber such that a lower end of the liquid return line is positioned below the surface of the liquid passing through the horizontal chamber.

* * * * *